United States Patent
Saeki

(10) Patent No.: US 12,094,464 B2
(45) Date of Patent: Sep. 17, 2024

(54) UTTERANCE ANALYSIS DEVICE, UTTERANCE ANALYSIS METHOD, AND COMPUTER PROGRAM

(71) Applicant: Panasonic Intellectual Property Management Co., Ltd., Osaka (JP)

(72) Inventor: Natsuki Saeki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 342 days.

(21) Appl. No.: 17/554,248

(22) Filed: Dec. 17, 2021

(65) Prior Publication Data

US 2022/0108697 A1    Apr. 7, 2022

Related U.S. Application Data

(63) Continuation of application No. PCT/JP2020/021811, filed on Jun. 2, 2020.

(30) Foreign Application Priority Data

Jul. 4, 2019   (JP) ................................ 2019-125454
Jul. 22, 2019  (JP) ................................ 2019-134559

(51) Int. Cl.
  *G10L 15/22* (2006.01)
  *G06F 16/35* (2019.01)
  (Continued)

(52) U.S. Cl.
  CPC ............ *G10L 15/22* (2013.01); *G06F 16/353* (2019.01); *G06F 40/295* (2020.01); *G06F 40/35* (2020.01);
  (Continued)

(58) Field of Classification Search
  CPC ......... G10L 15/22; G10L 15/18; G10L 15/26; G06F 16/353; G06F 40/35; G06F 40/295; G06F 40/44
  See application file for complete search history.

(56) References Cited

U.S. PATENT DOCUMENTS 9,420,227 B1 *   8/2016   Shires ...................... H04N 7/15
2008/0300872 A1 * 12/2008  Basu .................... G06F 16/7844
                                                      704/235

(Continued)

FOREIGN PATENT DOCUMENTS

JP   2011-123706   6/2011
JP   2011-221873   11/2011

(Continued)

OTHER PUBLICATIONS

International Search Report issued Aug. 25, 2020 in International (PCT) Application No. PCT/JP2020/021811.

(Continued)

*Primary Examiner* — Fan S Tsang
*Assistant Examiner* — David Siegel
(74) *Attorney, Agent, or Firm* — Wenderoth, Lind & Ponack, L.L.P.

(57) ABSTRACT

An utterance analysis device including: a storage that stores a plurality of pieces of related information each relating to one of a plurality of categories; a control circuit that receives utterance data of an utterer in order of time series, and analyzes content of the utterance data by using a plurality of first likelihoods, which are each values for identifying a possibility that the utterance data acquired by the acquire corresponds to each category; and a display processor that displays, under control of the control circuit, display data including link information indicating an association for (Continued)

displaying related information relating to the category of the utterance data from the storage.

16 Claims, 10 Drawing Sheets

(51) Int. Cl.
    *G06F 40/295*     (2020.01)
    *G06F 40/35*     (2020.01)
    *G06F 40/44*     (2020.01)
    *G10L 15/18*     (2013.01)
    *G10L 15/26*     (2006.01)

(52) U.S. Cl.
    CPC .............. *G06F 40/44* (2020.01); *G10L 15/18* (2013.01); *G10L 15/26* (2013.01)

(56) References Cited

U.S. PATENT DOCUMENTS

| | | | |
|---|---|---|---|
| 2018/0027351 A1* | 1/2018 | Cartwright | H04M 3/56 |
| | | | 381/303 |
| 2019/0294624 A1* | 9/2019 | Miyabe | G06F 16/35 |

FOREIGN PATENT DOCUMENTS

| | | |
|---|---|---|
| JP | 5329610 | 10/2013 |
| JP | 5468474 | 4/2014 |
| WO | 2018/110029 | 6/2018 |

OTHER PUBLICATIONS

International Preliminary Report on Patentability issued on Jan. 6, 2022, in International (PCT) Patent Application No. PCT/JP2020/021811.

* cited by examiner

FIG.2

| NO. | TEXT DATA | CATEGORY LIKELIHOODS ||||
| --- | --- | --- | --- | --- | --- |
| | | BUZZER | OVERHEAD LINE TROUBLE | EMERGENCY | EARTHQUAKE |
| 1 | THE BUZZER IS RINGING. | 1.000 | 0.000 | 0.000 | ... |
| 2 | BUZZER, I UNDERSTAND. | 1.000 | 0.000 | 0.000 | ... |
| 3 | ARE DOORS OPEN NOW? | 0.032 | 0.032 | 0.043 | ... |
| 4 | DOORS ARE OPEN. | 0.032 | 0.032 | 0.043 | ... |
| | ... | ... | ... | ... | ... | ns # UTTERANCE ANALYSIS DEVICE, UTTERANCE ANALYSIS METHOD, AND COMPUTER PROGRAM

CROSS-REFERENCE TO RELATED APPLICATIONS

This is a continuation application of International Application No. PCT/JP2020/021811, with an international filing date of Jun. 2, 2020, which claims priority of Japanese Patent Application No. 2019-125454 filed on Jul. 4, 2019, and Japanese Patent Application No. 2019-134559 filed on Jul. 22, 2019, each of the content of which is incorporated herein by reference in its entirety.

TECHNICAL FIELD

The present disclosure relates to an utterance analysis device, an utterance analysis method, and a non-transitory computer-readable recording medium storing a computer program, for analyzing a topic in an utterance of an utterer and providing information corresponding to the topic.

BACKGROUND ART

With advances in voice recognition technology, it has become possible to acquire voice data of an utterer and process voice-recognized content.

In Japanese Patent No. 5468474 discloses a system configured to convert the content of speaking referring to a talk script by an operator at a call center, for example, into text by voice recognition processing, and to output information on a usage frequency of the talk script. With the technology described in Japanese Patent No. 5468474, for example, a problem in that the quality of a response record varies depending on the skill of the operator can be solved, and a response record ensuring uniformity and conciseness can be

SUMMARY

The present disclosure provides an utterance analysis device, an utterance analysis method, and a program which are capable of analyzing a topic in an utterance of an utterer and providing information corresponding to the topic.

According to the present disclosure, there is provided an utterance analysis device including; a control circuit that receives utterance data of an utterer in order of time series and analyzes content of the utterance data by using a plurality of first likelihoods, which are each values for identifying a possibility that the utterance data acquired by the acquire corresponds to each category; and a display processor that displays, under control of the control circuit, display data including related information relating to the category of the utterance data, wherein the control circuit selects sequentially, from a storage stores a plurality of pieces of related information each relating to one of a plurality of categories, a piece of related information to be preferentially displayed by the display processor by using the plurality of first likelihoods each time the utterance data is acquired in the time series.

Those general and specific modes may be implemented by a system, a method, and a computer program stored, for example, on a non-transitory computer-readable recording medium, and combinations thereof.

According to the utterance analysis device, the utterance analysis method, and the computer program of the present disclosure, information corresponding to a topic in an utterance of an utterer can be provided.

BRIEF DESCRIPTION OF DRAWINGS

FIG. 2 is a data structure diagram illustrating utterance data to be used in the utterance analysis device of FIG. 1.

DETAILED DESCRIPTION

Figure 1:
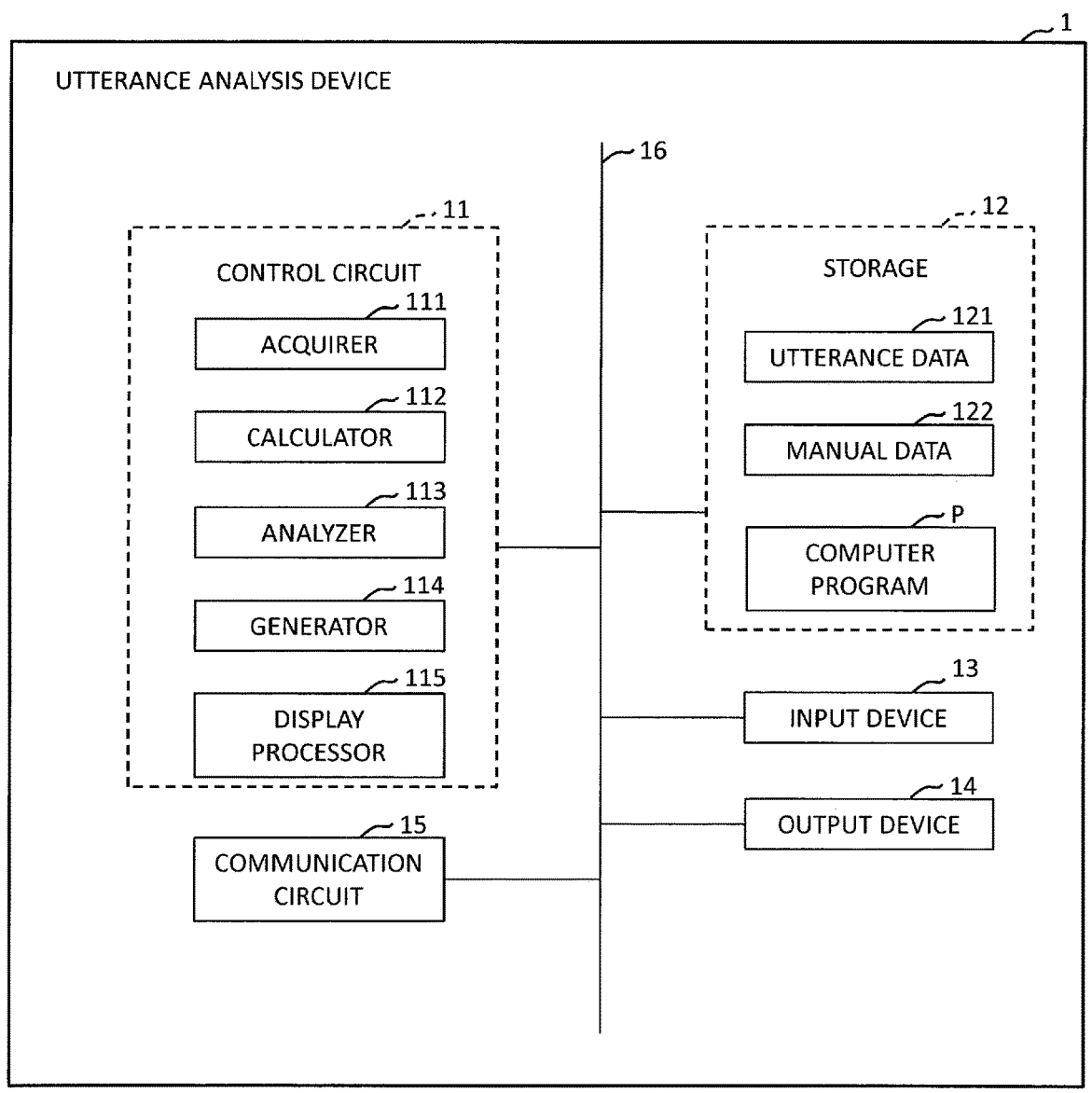
FIG. 1 is a block diagram illustrating a configuration of an utterance analysis device according to an embodiment of the present disclosure.

[Knowledge Forming the Basis of the Present Disclosure]

In the related art, when utterances of an utterer are analyzed, sentence units are set as a processing target, and analysis is performed by using words included in each sentence. Meanwhile, there are cases in which it may be preferred to analyze a plurality of sentences as targets instead of analyzing one sentence as a target.

An utterance analysis device according to the present disclosure provides information corresponding to a topic in an utterance of an utterer in a certain period. Specifically, the utterance analysis device can acquire the utterance of the utterer, identify the content of the utterance, and provide information corresponding to the topic.

EMBODIMENTS

1-1. Configuration

An embodiment of the present disclosure is now described with reference to the drawings as required. However, in the detailed description, of the description relating to the related art and configurations which are substantially the same, for the sake of simplicity, parts which are not required may be omitted. In addition, the following description and the accompanying drawings are disclosed so that those skilled in the art can fully understand the present disclosure, and are not intended to limit the subject matter of the claims.

The utterance analysis device according to the present disclosure provides required information when a plurality of utterers are having a conversation. For example, the utterance analysis device provides a second utterer, who is a respondent, with information to be used in an answer to an inquiry from a first utterer, who is a person asking a question or asking for advice, for example.

In the following, the first utterer is a crew member of a vehicle, and the second utterer is an operator responding to an inquiry from the crew member. The first utterer and the second utterer are having a conversation by using a communication line, for example, a telephone. There is now described an example in which the conversation of those utterers is analyzed and information corresponding to the analysis results is provided to the operator.

When responding to an inquiry, the operator may respond by using a method specified by information in a manual, for example. However, there is a large number of manuals, and therefore it is difficult for the operator to instantly identify the manual relating to the content of the inquiry. Therefore, the utterance analysis device acquires and analyzes the inquiry from the crew member and the utterance of the answer by the operator to the inquiry via terminals used by the crew member and the operator, and identifies a topic category of the utterance. Further, the utterance analysis device selects the manual associated with the topic category from a plurality of pieces of information as the manual for finding the answer to the inquiry from the crew member, and provides the selected manual to the operator.

As used herein, "utterance" means an action of speaking by the utterer and a voice generated by speaking, and "utterance data" is the voice data generated by the utterer speaking. "Utterance data" may be text data obtained by converting the voice data generated by the utterer who is speaking into text by voice recognition. Further, the "utterance data" may be data including such "voice data" and "text data."

As used herein, "a topic" refers to content of utterance of the utterer. Further, a "topic category" or "category" means a classification for identifying a topic of the utterer. Specific examples are described later, but of a plurality of topic categories set in advance, an utterance analysis device 1 identifies which of those categories the topic of the utterance of the utterer corresponds to.

As used herein, "likelihood" is a numerical value representing a likelihood to be used in a likelihood function. The likelihood is used as a numerical value representing the likelihood of the target utterance corresponding to each topic category.

As illustrated in FIG. 1, the utterance analysis device 1 is an information processing device including, for example, a control circuit 11, a storage 12, an input device 13, an output device 14, and a communication circuit 15. Those circuits and devices are connected by a bus 16.

The control circuit 11 is a controller for controlling the whole utterance analysis device 1. For example, the control circuit 11 implements processing as an acquire 111, a calculator 112, an analyzer 113, a generator 114, and a display processor 115 by reading and executing a program P stored in the storage 12. Further, the control circuit 11 is not limited to a control unit for implementing a predetermined function through cooperation of hardware and software, and may be a hardware circuit specially designed to implement a predetermined function. That is, the control circuit 11 can be implemented by one or more various processors, for example, a central processing unit (CPU), a microprocessing unit (MPU), a graphics processing unit (GPU), a field programmable gate array (FPGA), a digital signal processor (DSP), and an application specific integrated circuit (ASIC).

The storage 12 includes a storage medium for storing various types of information. The storage 12 is implemented, for example, by a random-access memory (RAM), a read-only memory (ROM), a flash memory, a solid-state drive (SSD), a hard disk drive, another storage device, or an appropriate combination thereof. In addition to the program P to be executed by the control circuit 11, the storage 12 stores, for example, information to be used as identification information, and various information acquired in order to assign the identification information. For example, the storage 12 stores utterance data 121, manual data 122, and the program P.

The input device 13 is input means, for example, an operation button, a keyboard, a mouse, a touch panel, or a microphone, which is used to perform operations and input data. The output device 14 is output means, for example, a display or a speaker, which is used to output processing results and data. The utterance analysis device 1 acquires utterance data by using a microphone, which is the input device 13, generates visualization data from the acquired utterance data by using the control circuit 11, and outputs the obtained visualization data to a display, for example, which is the output device 14.

The communication circuit 15 is an interface circuit (module) for enabling data communication to and from an external device (not shown).

Here, the utterance analysis device 1 may be implemented by one computer, or may be implemented by a combination of a plurality of computers connected via a network. Further, for example, all or a part of the data stored in the storage 12 may be stored in an external storage medium connected via a network, and the utterance analysis device 1 may be use the data stored in the external storage medium. Specifically, the utterance data 121 and the manual data 122 may be stored in an external storage medium.

For example, the utterance analysis device 1 is installed so as to be communicable to and from the terminal used by the crew member and the terminal used by the operator, and is configured such that the utterances of the crew member and the operator can be acquired. As another example, the utterance analysis device 1 may be installed so as to be communicable to and from the terminal used by the crew member, itself be the terminal used by the operator, and be configured such that the utterances of the crew member and the operator can be acquired.

The acquire 111, for example, acquires the utterance data of an utterer via the communication circuit when the utterer makes an utterance. The acquire 111 acquires the acquired utterance data of the utterer in time-series order. The acquire 111 assigns a number to the acquired utterance data in time-series order, and stores the numbered utterance data in the storage 12 as the utterance data 121.

The calculator 112 determines a likelihood, which is a value for identifying the possibility that the topic of each piece of utterance data 121 corresponds to each predetermined category. Further, the calculator 112 stores the likelihood of each category determined for each piece of utterance data 121 in association with the utterance data 121. As used herein, the "likelihood" for each category is referred to as a "category likelihood" as required.

The utterance data 121 can include, together with the voice data or in place of the voice data, text data obtained by converting the voice data into text by voice recognition processing. In this case, the voice recognition processing may be executed in the utterance analysis device 1 or by an external device.

As shown in FIG. 2 as an example, the utterance data 121 is data for associating a "number," which is identification information of each piece of utterance data 121, the "text data" generated from voice data during this period, and the "category likelihood" of each category obtained for the utterance data of the period. In FIG. 2, the utterance data 121 has the topic categories "buzzer," "overhead line trouble," "emergency," and "earthquake." "Buzzer" is a topic category when the buzzer sounds. "Overhead line trouble" is a topic category when an overhead line trouble occurs. "Emergency" is a topic category when a person suddenly becomes ill. "Earthquake" is a topic category when an earthquake occurs.

Here, for ease of understanding, there is described an example using four categories, that is, "buzzer," "overhead line trouble," "emergency," and "earthquake," but the number of categories to be processed by the utterance analysis device 1 is not limited. Further, the categories described here are merely examples. The present disclosure is not limited to those examples, and categories may be freely set in accordance with the content of the utterance.

Figure 3:
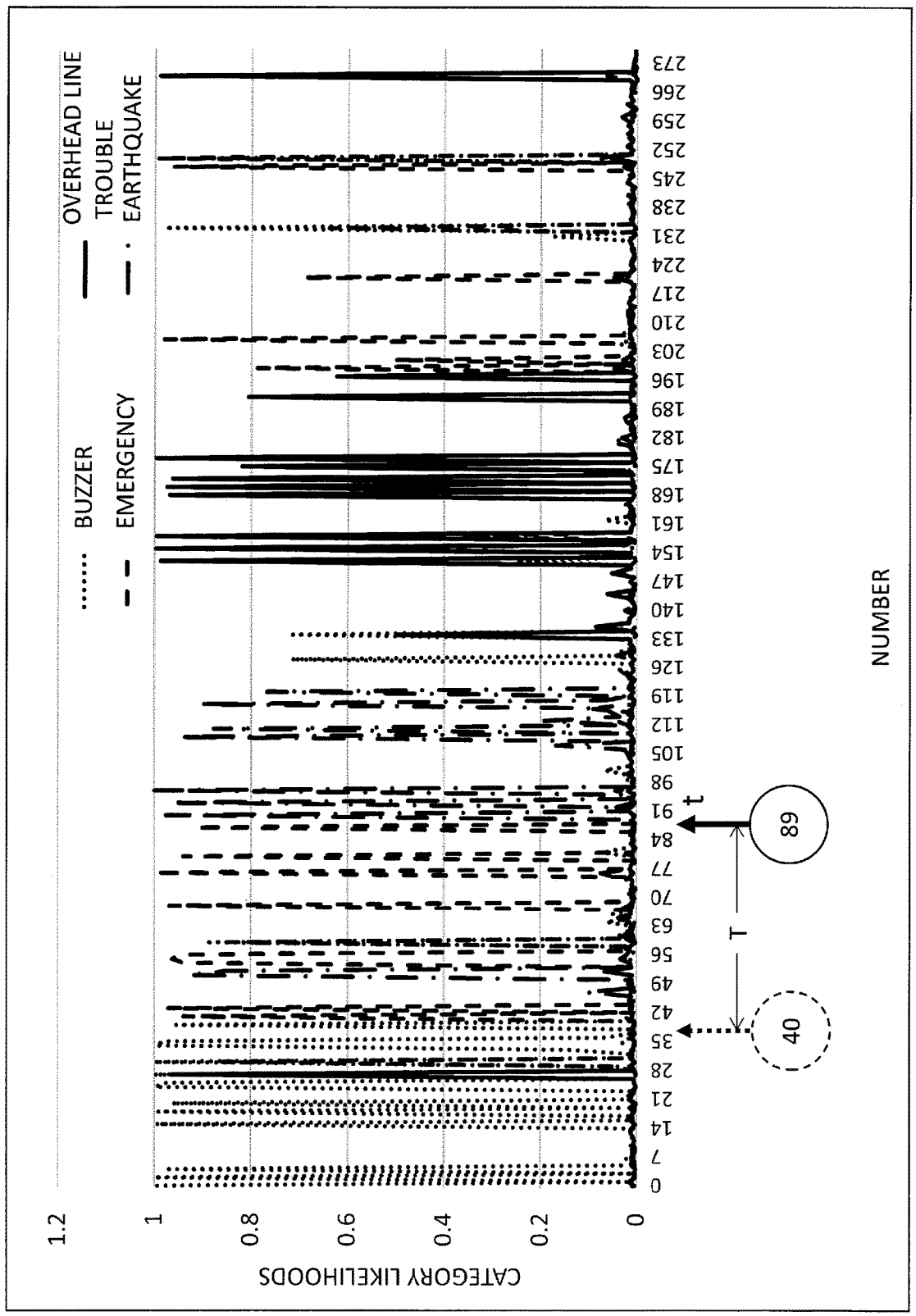
FIG. 3 is a graph showing category likelihoods to be used in the utterance analysis device of FIG. 1.

FIG. 3 is an example of a graph for showing the category likelihoods determined in the calculator 112 for a plurality of categories of topics being topics set in advance in relation to a plurality of pieces of utterance data 121. The calculator 112 can determine each category likelihood by using a class classification model learned in advance. Specifically, the classes of the class classification correspond to the topic categories described above. In FIG. 3, the horizontal axis represents the "number" being the identification information of the utterance data 121, and shows the time series of the utterance data 122. The vertical axis represents the "category likelihood" obtained by the calculator 112.

The category likelihoods shown in FIG. 3 are an example of the category likelihoods obtained for each of the categories of "buzzer," "overhead line trouble," "emergency," and "earthquake."

In the categories for each piece of utterance data 121 as shown in FIG. 3, the changes are complex, and it is difficult to identify the topic as a whole. Therefore, in the utterance analysis device 1, the categories are identified by the analyzer 113 for a wider range than the classification of the categories of each piece of utterance data 121, and as a result, the topic category can be grasped more easily.

The analyzer 113 analyzes the topic category by using the category likelihoods obtained by the calculator 112. When identifying the topic category of a certain time point "t", the analyzer 113 uses the category likelihoods of a plurality of pieces of utterance data 121 of an analysis target period T immediately before the time point "t" to determine a second likelihood identifying the possibility of the utterance of the analysis target period T corresponding to a predetermined category, and identifies the topic category of the analysis target period T. In the following, as required, the "second likelihood" is referred to as "integrated likelihood."

In FIG. 3, the analysis target period T is an example of a period corresponding to 50 pieces of the utterance data 121. For example, in order to identify the topic category at the time of number "89", the category likelihoods of the pieces of utterance data 121 in the period from numbers "40" to "89" corresponding to the analysis target period T are used.

Specifically, the analyzer 113 sets the target range for each category, and determines the integrated likelihood for each category obtained for each piece of utterance data 121 included in this target range. Further, the analyzer 113 can identify the category having the largest value among the integrated likelihoods obtained for each category as the topic category at the time having a certain utterance number.

Figure 4A:
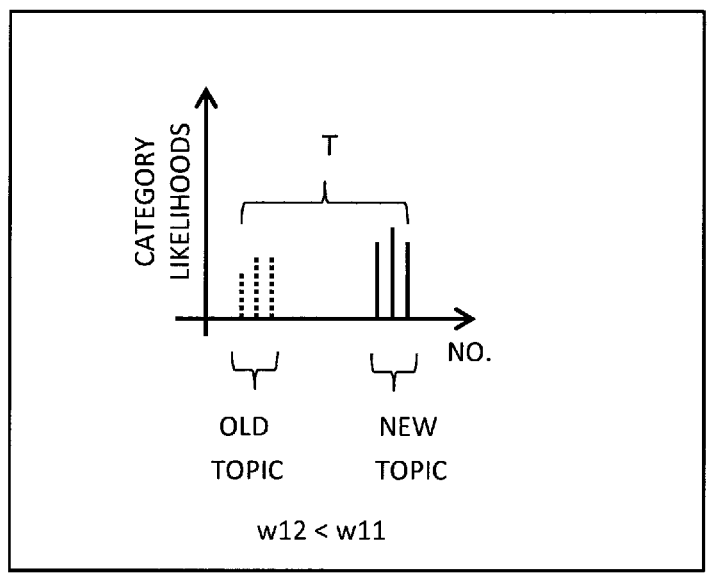
FIG. 4A is a graph showing a freshness weighting value to be used in calculation of an integrated likelihood in the utterance analysis device of FIG. 2.

In addition, the analyzer 113 can determine the integrated likelihood by using a "freshness weighting value w1" set in accordance with a freshness of the topic. Specifically, as shown in FIG. 4A, the freshness weighting value w1 is a value which increases the weighting of a category likelihood of new utterance data 121 ("w11" of FIG. 4A) with respect to the time "t" of the end of the analysis target period T more than the weighting of a category likelihood of old utterance data 121 ("w12" of FIG. 4A). For example, in a certain target range, newer utterances have a higher possibility of being the topic category of the period, or there is a higher possibility that the topic is changed, and older utterances have a lower possibility of being the topic category of the period. Therefore, in the analyzer 113, the accuracy of identifying the topic can be improved by using the freshness weighting value w1 to identify the topic of the analysis target period T. Specifically, when "5 minutes" is set as the analysis target period T, the category likelihood identified from the utterance data 121 within 1 minute from the end of the analysis target period T is set to have a higher weighting than the category likelihood identified from the utterance data 121 of 4 minutes or more before the end of the analysis target period T.

Figure 4B:
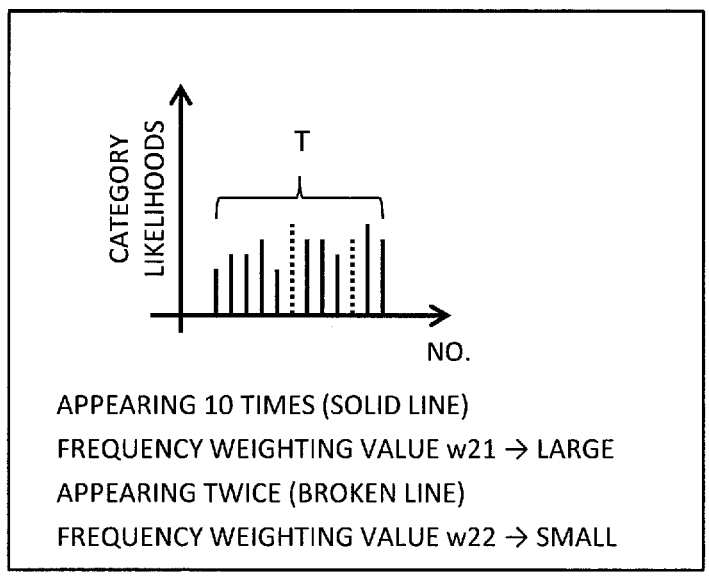
FIG. 4B is a graph showing a frequency weighting value to be used in calculation of the integrated likelihood in the utterance analysis device of FIG. 2.

Further, the analyzer 113 can determine the integrated likelihood by using a "frequency weighting value w2" set in accordance with a topic frequency. Specifically, as shown in FIG. 4B, the frequency weighting value w2 is a value that, for the appearance frequency of the category having the highest category likelihood of the utterance data 121 included in the target range, increases the weighting of the category likelihood of category having a high appearance frequency ("w21" of FIG. 4B) more than the weighting of the likelihood of the category having a low appearance frequency ("w22" of FIG. 4B). For example, in the range of the analysis target period T, a category appearing many times has a higher possibility of being the topic category for that period, while a category that does not appear often has a lower possibility of being the topic category for that period. Therefore, in the analyzer 113, the accuracy of identifying the topic can be improved by using the frequency weight value w2 to identify the topic of the analysis target period T. Specifically, when the analysis target period T includes 50 pieces of the utterance data 121, a category appearing 20 times is set to have a higher weighting and a larger category likelihood than those of a category appearing only twice. The analyzer 113 calculates the appearance frequency ("w21" and "w22" of FIG. 4B) of each category in the range of analysis target period T in the manner described above.

For example, the analyzer 113 can determine an integrated likelihood Lc2 for each category based on the following expression (1).

$$Lc2(i) = \Sigma(Lc(j) \times w1) \times w2 \qquad (1)$$

Each value used in expression (1) is defined as follows.
c: Number identifying the category
i: Number identifying the target range
Lc2(i): Integrated likelihood of an i-th target range
j: Number assigned to each piece of utterance data 121 in the target range
Lc(j): Category likelihood of a j-th piece of utterance data 121 in the target range
w1: Freshness weighting value
w2: Frequency weighting value
Expression (1) is the sum of i=1 to i=q (the number of the target range described later).

Figure 5:
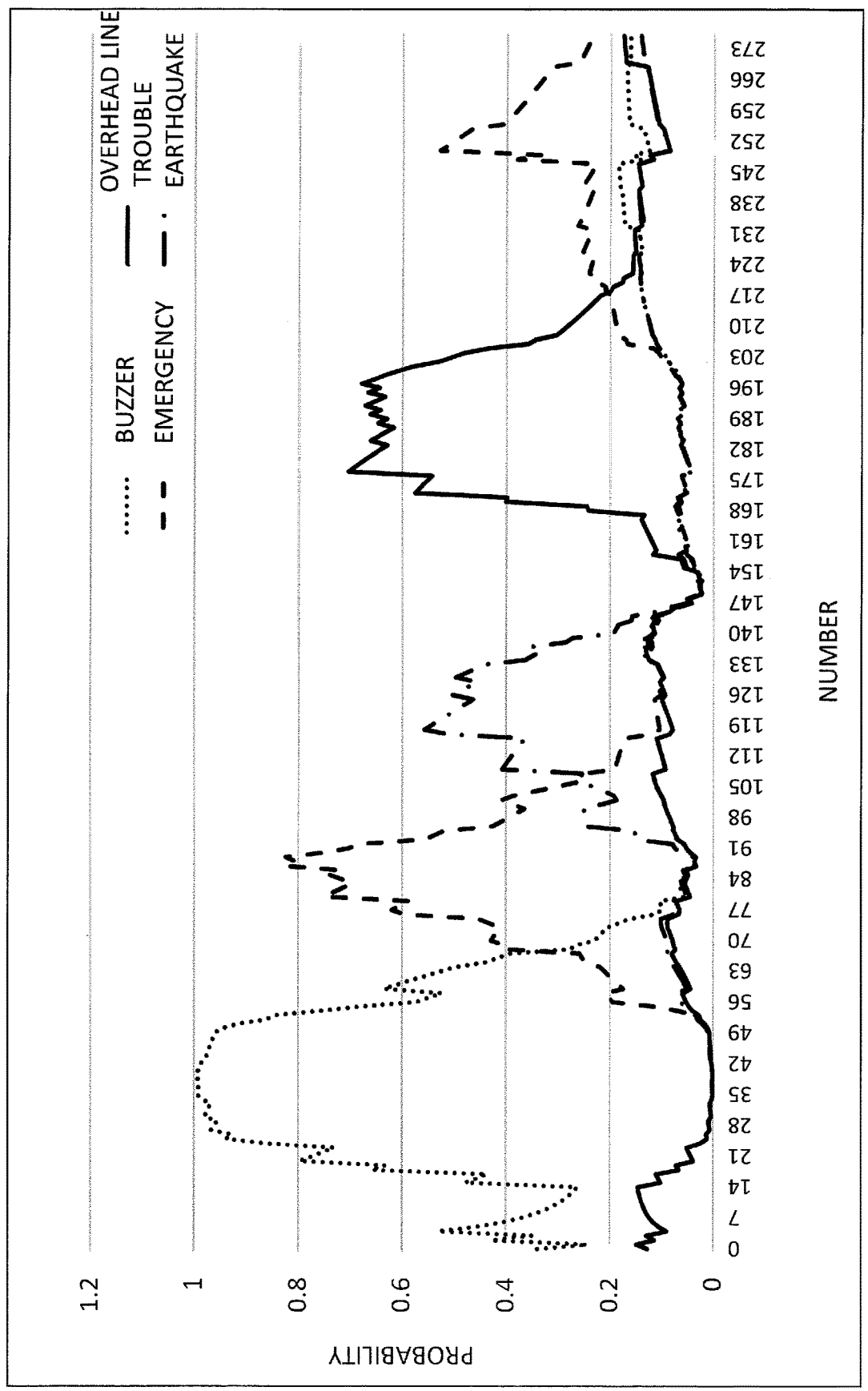
FIG. 5 is a graph showing a probability of being a topic obtained by the utterance analysis device of FIG. 2.

For example, through application of the normalization described later to the integrated likelihood Lc2 of each category obtained by this, the probability that each category in an utterance having a certain number is the topic can also be represented as shown in FIG. 5.

The generator 114 uses the analysis results obtained by the analyzer 113 to generate visualization data identifying the content of the utterance data 121 and the manual corresponding to the content. Specifically, the generator 114 generates visualization data for displaying a display screen W1 like that illustrated in FIG. 6A as an example. The display screen W1 of the example illustrated in FIG. 6A includes a display section B11 displaying the text data of the plurality of pieces of utterance data 121 arranged in time series, and a display section B12 displaying link information, which is the analysis results of the plurality of pieces of utterance data 121, for displaying the manuals relating to the categories of the utterance data 121 in descending order of integrated likelihood. The display section B12 includes the integrated likelihood calculated for each category. The display screen W1 shown in FIG. 6A enables the operator to grasp that the content of the utterance relates to "buzzer." Further, by selecting "buzzer," the operator can be guided to a reference material, for example, a manual, when "buzzer" becomes the topic.

Figure 6A:
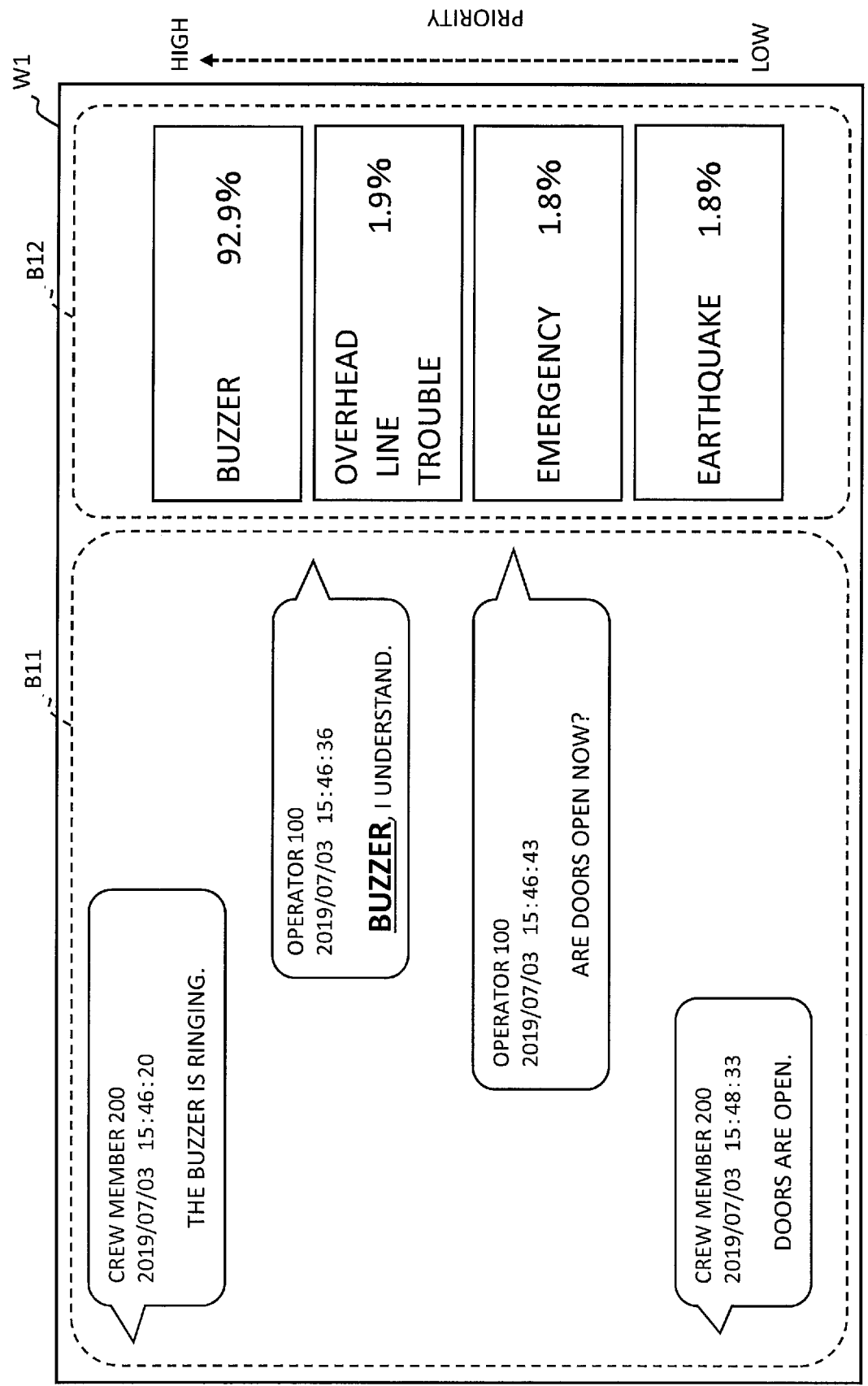
FIG. 6A is an example of a screen displayed as visualization data by the utterance analysis device of FIG. 2.
Figure 6B:
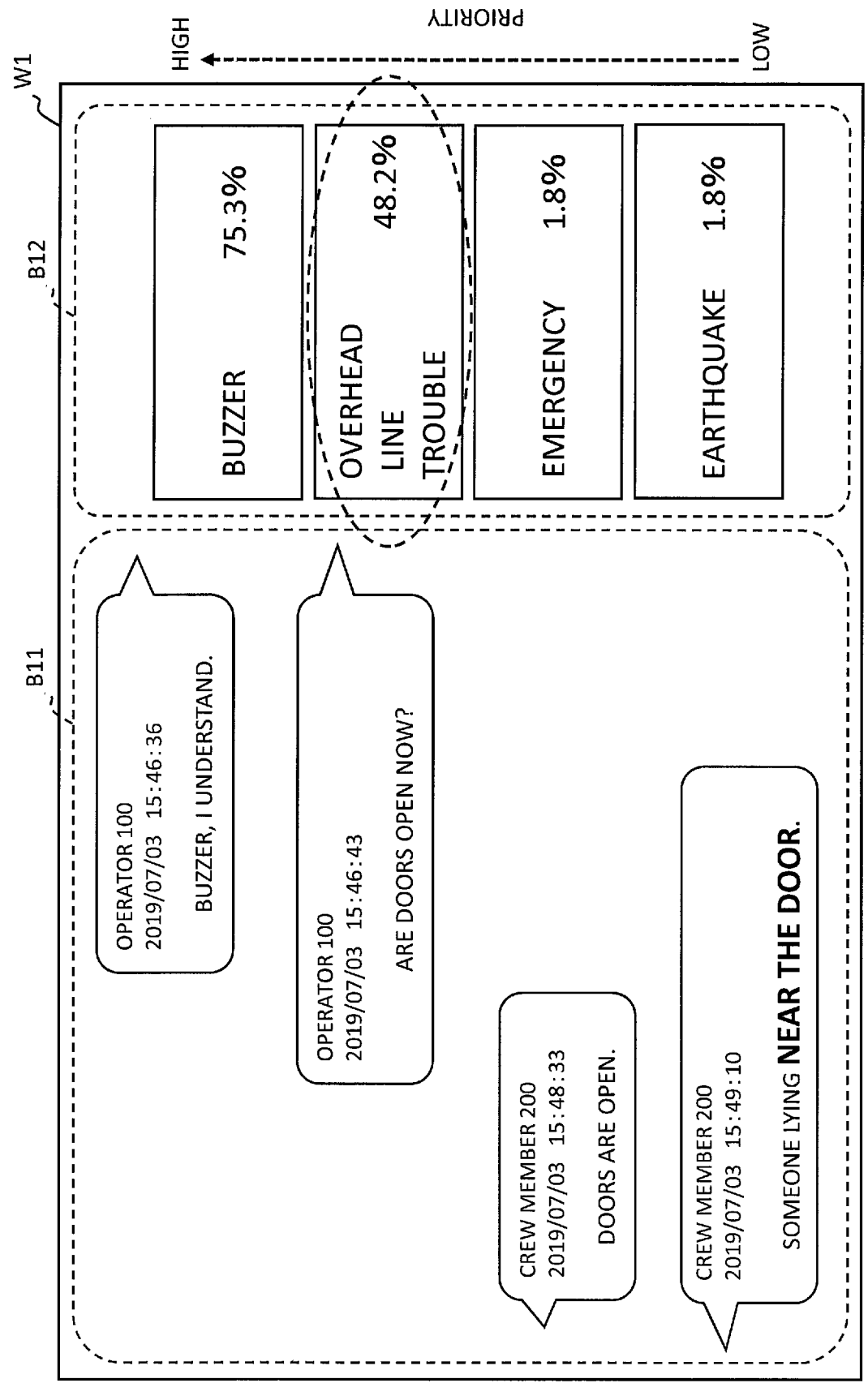
FIG. 6B is an example of a screen displayed as visualization data following FIG. 6A.

When, as illustrated in FIG. 6B, integrated likelihoods are newly obtained due to new utterance data 122 being acquired and analysis being performed by the analyzer 113, the categories are sequentially selected in descending order of the new integrated likelihoods. As a result, the order displayed in display section B12 in the order of "buzzer," "overhead line trouble," "emergency," and "earthquake" illustrated in FIG. 6A is changed to the order illustrated in FIG. 6B, that is, "buzzer," "emergency," "overhead line trouble," and "earthquake." This is because the newly obtained utterance data 122 has increased the integrated likelihood of the "emergency" category.

1-2. Operation

Figure 7:
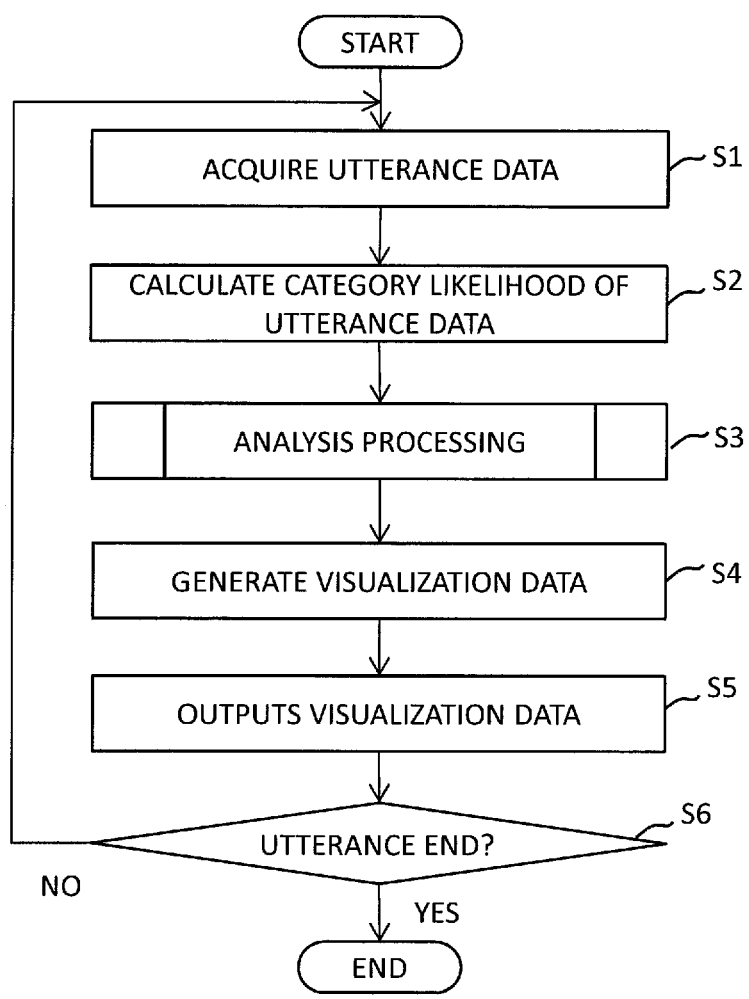
FIG. 7 is a flowchart illustrating utterance analysis processing to be executed by the utterance analysis device of FIG. 2.
Figure 8:
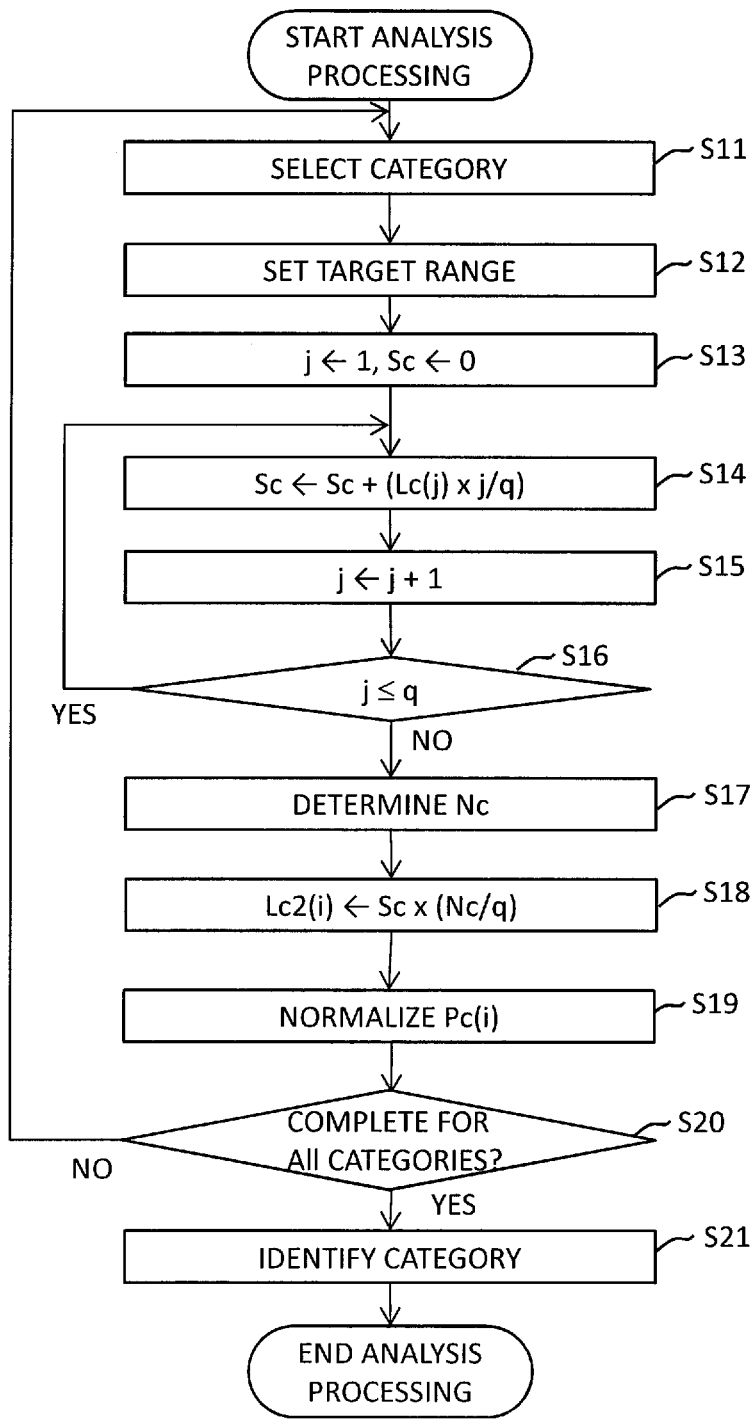
FIG. 8 is a flowchart illustrating analysis processing of FIG. 7.

Utterance analysis processing of the utterance data in the utterance analysis device 1 is now described with reference to the flowcharts illustrated in FIG. 7 and FIG. 8. As illustrated in FIG. 7, in the utterance analysis device 1, when the utterer makes an utterance, the acquire 111 acquires the utterance data and stores the acquired utterance data together with a time-series assigned number in the storage 12 as the utterance data 121 (Step S1).

Then, the calculator 112 calculates the category likelihood for each category for each piece of utterance data 121 stored in Step S1, and stores the calculated category likelihoods in the utterance data 121 (Step S2).

Then, the analyzer 113 uses category likelihood included in the utterance data 121 to analyze the utterance data 121 of the analysis target period (Step S3).

The specific processing flow in the analysis processing of Step S3 is now described with reference to the flowchart illustrated in FIG. 8. As illustrated in FIG. 8, in identification processing, the analyzer 113 selects the category to be processed in order (Step S11). For example, each of the categories of "buzzer," "overhead line trouble," "emergency," and "earthquake" is selected in order, and the following processing is executed for each category.

First, the analyzer 113 sets the target range for calculating the integrated likelihood (Step S12). Specifically, the target range is set with reference to the number of the utterance data 121 acquired in Step S1 of the flowchart of FIG. 8. At this time, the analyzer 113 sets a new number "j" from "1" in the target range for the utterance data 121 in the target range. As described above with reference to FIG. 3, in the example in which the 50 pieces of utterance data 121 are set as the analysis target period T, "j" uses a number of from 1 to 50. In this case, the number "q" of the target range is "50".

Specifically, as described above with reference to FIG. 3, when "i" is "89", the analyzer 113 sets the utterance data 121 from numbers 40 to 89 as the target range. In this case, "j" is set such that "j" is "1" when "i" is "40", and "j" is "50" when "i" is "89".

Further, in a case in which when "i" is "39", in order to calculate the integrated likelihood of the series of utterance data 121 with reference to the 39th piece of the utterance data 121, the analyzer 113 sets the utterance data 121 from numbers 0 to 40 as the target range. In this case as well, regarding "j", "j" is "1" when "i" is "0". Further, the number "q" of the target range is "41".

After that, in order to calculate the integrated likelihood for the target range set in Step S12, the analyzer 113 initializes the value of "j" to 1, and initializes a value of a temporary integrated likelihood Sc to 0 (Step S13). As described above, "j" is a value for specifying the utterance data 121 in the target range. Through the initialization of "j", the category likelihood Lc(j) of each piece of utterance data 121 included in the target range can be added to obtain the integrated likelihood Lc2(i). Further, the temporary integrated likelihood Sc is a value used in the calculation process for determining the integrated likelihood Lc2(i) in the target range.

Next, the analyzer 113 adds the value (Lc(j)×w1) obtained by weighting the category likelihood Lc(j) of the utterance data 121 of the number "j" by the freshness weighting value w1 (=j/q) to the temporary integrated likelihood Sc, and sets the obtained value as a new temporary integrated likelihood Sc (Step S14).

When the new temporary integrated likelihood Sc is determined, the analyzer 113 increments the value of "j" (Step S15). Then, the analyzer 113 determines whether or not "j≤q" is satisfied (Step S16).

When "j≤q" is satisfied (YES in Step S16), this means that the processing has not been completed for all the utterance data 121 included in the target range, and therefore the process returns to the processing of Step S14, and the analyzer 113 repeats the processing of Step S14 to Step S16.

Meanwhile, when "j≤q" is not satisfied (NO in Step S16), this means that the processing is complete for all utterance data 121 included in the target range, and therefore the analyzer 113 determines a maximum likelihood topic category frequency Nc of the target category in the target range (Step S17). The maximum likelihood topic category frequency Nc is the number of times that the likelihood of the category selected as the processing target in Step S11 became the highest value in each piece of utterance data 121 of the target range. For example, in a case in which processing is being performed regarding "overhead line trouble," when the number of utterance data 121 having the highest category likelihood Lc(j) of "overhead line trouble" in the target range is "20", the maximum likelihood topic category frequency Nc is "20".

Then, the analyzer 113 sets a value (Sc×w2) obtained by weighting the temporary integrated likelihood Sc by the frequency weighting value w2 (=Nc/q) as the integrated likelihood Lc2(i) of the target range (Step S18).

When the integrated likelihood L2c(i) is determined, the analyzer 113 determines a probability Pc(i) of the selected category for the target range by normalization (Step S19). For normalization, the analyzer 113 can use, for example, a method of determining the probability by softmax. A graph (FIG. 5) for showing changes in the topic can be obtained by plotting the probability values of each category at each utterance number by using Pc(i) thus obtained. As a result, a transition state of the topic can be visualized as a smooth change, similarly to the changes in topic in an actual conversation.

After that, when the analyzer 113 determines whether or not the processing of Step S12 to Step S19 is complete for all categories (Step S20). When the processing has not been completed (NO in Step S20), the process returns to Step S11. Then, the analyzer 113 selects another category, and repeats the processing of Step S11 to Step S19 until all categories are complete. For example, when the "buzzer" category is complete, the same processing is repeated by selecting "overhead line trouble," then "emergency," and lastly "earthquake."

When the processing of Step S11 to Step S19 is complete for all categories (YES in Step S20), the analyzer 113 identifies the categories by using the integrated likelihood Lc2(i) and the probability Pc(i) for each category, and ends the analysis processing (Step S3 of FIG. 8) (Step S21).

As illustrated in FIG. 7, the generator 114 generates visualization data for each category in the processing of Step S4 (Step S4).

Further, the display processor 115 outputs the visualization data generated in Step S4 to the output device 14 (Step S5).

Then, when the utterance continues (NO in Step S6), the process returns to the processing of Step S1, and the utterance analysis device 1 repeats the processing of Step S1 to Step S5.

Meanwhile, when the utterance has ended (YES in Step S6), the utterance analysis device 1 ends the processing.

1-3. Effect and Others

As described above, in the utterance analysis device 1, the utterance of the utterer can be analyzed and information corresponding to the topic in the utterance of the utterer in a certain period can be provided. Further, the utterer can thus easily access information corresponding to the current situation.

As described above, the embodiment described above has been described as an example of the technology disclosed in the present application. However, the technology of the present disclosure is not limited to this, and can also be applied to embodiments in which modifications, replacements, additions, and omissions, for example, have been made as appropriate.

Other Embodiments

In the embodiment, there is described an example in which the calculator 112 included in the utterance analysis device 1 calculate the "category likelihood," but the present disclosure is not limited to this. Specifically, the utterance analysis device 1 may acquire and use a category likelihood calculated by an external calculation device.

Further, in the embodiment, there is described an example in which the utterance data 121 to be processed by the calculator 112 and the analyzer 113 is processed without distinguishing between utterance data from the crew member and utterance data from the operator, but the utterance data 121 may be distinguished. Specifically, only the content uttered by the operator may be processed, and the content uttered by the crew member may not be processed. For example, depending on the situation, the utterances between the crew member and the operator may be repeated. Further, when the operator can select and utter terms, for example, that are more appropriate for processing than the crew member, through use of the utterances from only one of the utterers, the accuracy of the processing result can be improved.

The analyzer 113 can calculate the integrated likelihood by using the period specified by a user as the analysis target period T. Specifically, the utterer or the user other than the utterer, may freely set the analysis target period T in accordance with the target utterance. When a topic of a certain category continues for a long time in the utterances, depending on the length of the period set as analysis target period T, it can become difficult to detect a change in the topic. Therefore, by setting an appropriate analysis target period T in this way, it is possible to improve the detection accuracy of a change in the topic. For example, the analyzer 113 can serve as a receiver receives a period specified by the user via the input device 13 and the communication circuit 15, and the received period can be used as the analysis target T.

Figure 9:
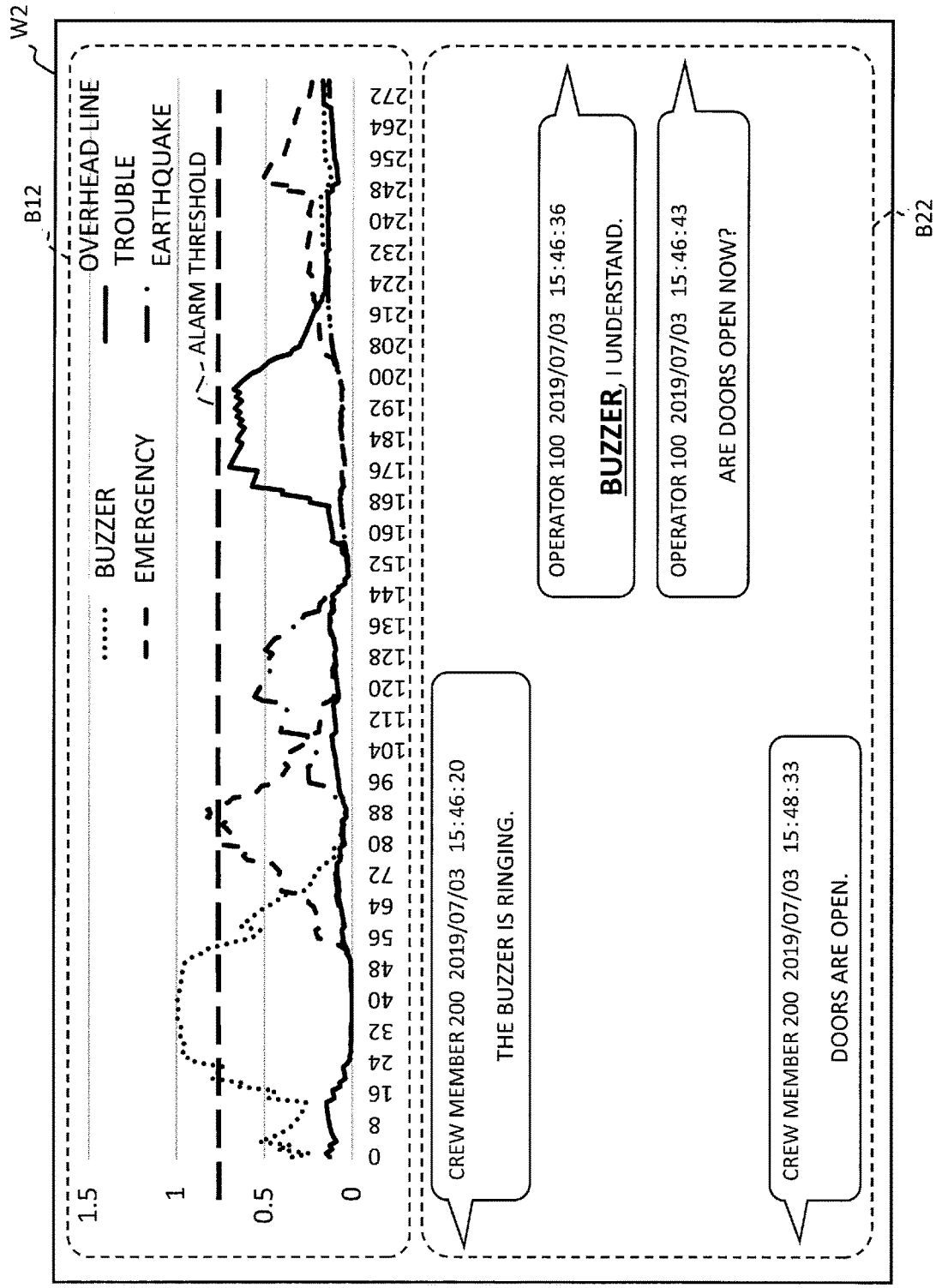
FIG. 9 is another example of a screen displayed as visualization data by the utterance analysis device of FIG. 2.

The generator 114 may generate visualization data for displaying a display screen W2 like that illustrated as an example in FIG. 9. The example display screen W2 illustrated in FIG. 9 includes a display section B21 showing a graph of the integrated likelihood obtained from the utterance data 121, and a display section B22 displaying text data. For example, in a case in which there is a third party who assists the conversation between the crew member and the operator as required, even when the third party did not listen to the series of conversations between crew member and the operator, the third party can easily identify what category topics the conversation in the series of utterance data 121 has progressed through by looking at the display screen W2, and therefore can appropriately assist the conversation.

Further, in a case in which the acquire 111 has acquired new utterance data 121 in place of a continuous series of utterance data 121, when a series of utterance data 121 by the same utterer in the past is stored in the storage 121, this series of utterance data 121 can be continuously processed. For example, in the case of a conversation between a crew member and an operator, in response to a question from the operator, the crew member may temporarily end the conversation in order to perform a confirmation task and then resume the conversation after a certain period of time has passed. In such a case, through assignment of consecutive numbers to the past series of utterance data 121 and the newly started series of utterance data 121, the data can be treated as being related. Further, the color, font, and character size, for example, of a predetermined term ("buzzer" in the example of FIG. 9) may be different from those of other terms, and may be displayed in an emphasized manner. This makes it easier to understand the important content of the conversation.

SUMMARY OF EMBODIMENTS (1) An utterance analysis device of the present disclosure includes; a control circuit receives utterance data of an utterer in order of time series and analyzes content of the utterance data by using a plurality of first likelihoods, which are each values for identifying a possibility that the utterance data acquired by the acquire corresponds to each category; and a display processor that displays, under control of the control circuit, display data including related information relating to the category of the utterance data, and the control circuit may be select sequentially, from a storage stores a plurality of pieces of related information each relating to one of a plurality of categories, a piece of related information to be preferentially displayed by the display processor by using the plurality of first likelihoods each time the utterance data is acquired in the time series.

As a result, information corresponding to a topic in an utterance of an utterer can be provided.

(2) The control circuit of Item (1) may be: calculate a second likelihood for each category by integrating the first likelihoods of a plurality of pieces of utterance data in an analysis target period in the time series; and cause the display processor to display corresponding related information by giving priority to the category having a higher second likelihood.

As a result, information is provided by giving priority to a category having a higher likelihood, and therefore the most appropriate information can be provided.

(3) The control circuit of Item (2) may be determine the second likelihood by using a first weighting value which is set to a larger value as a frequency of appearing in the analysis target period becomes higher.

As a result, the likelihoods are calculated based on appearance frequency, and therefore the most appropriate information can be provided.

(4) The control circuit of Item (2) or (3) may be determine the second likelihood by using a second weighting value which is set to a larger value as the utterance data becomes closer to an end of the analysis target period than a start of the analysis target period.

As a result, the likelihoods are calculated based on an appearance timing, and therefore the most appropriate information can be provided.

(5) The utterance analysis device of Items (2) to (4) may further include a receiver receives input of a period specified by a user, and the control circuit may be determine the second likelihood by using the period received by the receiver as the analysis target period.

As a result, the user can set the analysis target period, and therefore the most appropriate information can be provided to the user.

(6) The control circuit of Items (2) to (5) may be select a predetermined number of pieces of information associated with categories having a high second likelihood, and the display data displayed by the display processor may include the predetermined number of pieces information in descending order of the second likelihood.

As a result, the display data is presented in order of the data having a higher possibility of being the utterance category, and therefore information which is easier for the user to understand can be presented.

(7) The display data displayed by the display processor of Items (1) to (6) may include, in time series of utterances, text data obtained by converting the utterance data into text by voice recognition processing.

As a result, the content of the conversation can be grasped, and therefore information which is easier for the user to understand can be presented.

(8) The display data displayed by the display processor of Item (7) may be data in which a predetermined term in the text data is emphasized.

As a result, a point of the content of the conversation can be grasped, and therefore information which is easier for the user to understand can be presented.

(9) The control circuit of Items (1) to (8) may be calculate the first likelihood relating to each category for each piece of utterance data.

As a result, a first likelihood can be calculated in the utterance analysis device, and therefore processing can be performed independently of the network load.

(10) The utterance data of Items (1) to (9) may be data of conversation among a plurality of utterers.

As a result, the likelihoods can be calculated from a larger amount of information, and therefore it is easier to identify the topic category.

(11) An utterance analysis method of the present disclosure is an utterance analysis method for analyzing content of an utterance of an utterer and displaying information on the utterance, the utterance analysis method comprising; receiving, from an input device, utterance data of an utterer in order of time series; analyzing, by a control circuit, content of the utterance data by using a plurality of first likelihoods, which are each values for identifying a possibility that the utterance data acquired by the acquire corresponds to each category; and displaying, by a display processor, under control of the control circuit, display data including related information relating to the category of the utterance data, wherein the control circuit select sequentially, from a storage stores a plurality of pieces of related information each relating to one of a plurality of categories, a piece of related information to be preferentially displayed by the display processor by using the plurality of first likelihoods each time the utterance data is acquired in the time series.

As a result, information corresponding to a topic in an utterance of an utterer can be provided.

(12) A program of the present disclosure causes a computer to execute the method of Item (11).

As a result, information corresponding to a topic in an utterance of an utterer can be provided.

The utterance analysis device, the utterance analysis method, and the program described in all the claims of the present disclosure are implemented through, for example, operation of hardware resources, for example, a processor and a memory, in cooperation with a program.

The utterance analysis device, the utterance analysis method, and the program of the present disclosure are useful when a person answering a question or an inquiry, for example, is to be guided to information, for example, a manual, to be referred to in order to provide an answer.

What is claimed is:

1. An utterance analysis device, comprising;
   a storage that stores a plurality of pieces of related information each relating to one of a plurality of categories;
   a control circuit that receives utterance data of an utterer in order of time series and analyzes content of the utterance data by using a plurality of first likelihoods, which are each values for identifying a possibility that the utterance data corresponds to each category; and
   a display processor that displays, under control of the control circuit, display data including link information indicating an association for displaying related information relating to the category of the utterance data from the storage,
   wherein the control circuit selects sequentially, from a plurality of pieces of link information corresponding to a plurality of pieces of related information relating to each category for each first likelihood, a piece of link information to be preferentially displayed by the display processor by using the plurality of first likelihoods each time the utterance data is acquired in the time series.

2. The utterance analysis device according to claim 1, wherein the control circuit:

calculates a second likelihood for each category by integrating the first likelihoods of a plurality of pieces of utterance data in an analysis target period in the time series; and causes the display processor to display link information for displaying corresponding related information by giving priority to the category having a higher second likelihood.

3. The utterance analysis device according to claim 2, wherein the control circuit determines the second likelihood by using a first weighting value which is set to a larger value as a frequency of appearance of a category having a highest first likelihood in the analysis target period becomes higher.

4. The utterance analysis device according to claim 2, wherein the control circuit determines the second likelihood by using a second weighting value which is set to a larger value as the utterance data becomes closer to an end of the analysis target period than a start of the analysis target period.

5. The utterance analysis device according to claim 2, further comprising a receiver that receives input of a period specified by a user, wherein the control circuit determines the second likelihood by using the period received by the receiver as the analysis target period.

6. The utterance analysis device according to claim 2, wherein the control circuit selects a predetermined number of pieces of information associated with categories having a high second likelihood, and wherein the display data displayed by the display processor includes the predetermined number of pieces of information in descending order of the second likelihood.

7. The utterance analysis device according to claim 1, wherein the display data displayed by the display processor includes, in time series of utterances, text data obtained by converting the utterance data into text by voice recognition processing.

8. The utterance analysis device according to claim 7, wherein the display data displayed by the display processor is data in which a predetermined term in the text data is emphasized.

9. The utterance analysis device according to claim 1, wherein the control circuit calculates the first likelihood relating to each category for each piece of utterance data.

10. The utterance analysis device according to claim 1, wherein the utterance data is data of conversation among a plurality of utterers.

11. The utterance analysis device according to claim 1, wherein the utterer is an inquirer and an operator, and wherein the related information is a manual relating to content of an inquiry.

12. The utterance analysis device according to claim 11, wherein the control circuit analyzes only content of utterance data of the operator.

13. The utterance analysis device according to 1, wherein the control circuit:

causes the display processor to display a plurality of pieces of link information in descending order of a priority order which is based on the plurality of first likelihoods; and receives input of a user operation for selecting one piece of link information from the plurality of pieces of displayed link information, and to control the display processor so that the related information corresponding to the one piece of link information selected by the user operation is displayed.

14. The utterance analysis device according to claim 1, wherein the plurality of pieces of related information indicate a plurality of materials each associated with one of the plurality of categories, and wherein the control circuit receives input of a user operation for selecting link information displayed by the display processor, and controls the display processor so that a corresponding material among the plurality of materials is displayed in accordance with the link information selected by the user operation.

15. An utterance analysis method for analyzing content of an utterance of an utterer and displaying information on the utterance, a plurality of pieces of related information each relating to one of a plurality of categories being stored in a storage;

the utterance analysis method comprising;

receiving, from an input device, utterance data of an utterer in order of time series;

analyzing, by a control circuit, content of the utterance data by using a plurality of first likelihoods, which are each values for identifying a possibility that the utterance data corresponds to each category; and displaying, by a display processor, under control of the control circuit, display data including link information indicating an association for displaying related information relating to the category of the utterance data from the storage, wherein the control circuit selects sequentially, from a plurality of pieces of link information corresponding to a plurality of pieces of related information relating to each category for each first likelihood, a piece of link information to be preferentially displayed by the display processor by using the plurality of first likelihoods each time the utterance data is acquired in the time series.

16. A non-transitory computer-readable recording medium storing a computer program causing a control circuit included in a computer to implement the utterance analysis method of claim 15.

* * * * *